US005659216A

United States Patent [19]
Bisantz

[11] Patent Number: 5,659,216
[45] Date of Patent: Aug. 19, 1997

[54] ROTOR CUP HAVING A ROLLED LOWER EDGE FOR SEGMENTED PERMANENT MAGNET MOTORS

[75] Inventor: Denis J. Bisantz, Chagrin Falls, Ohio

[73] Assignee: Ametek, Inc., Kent, Ohio

[21] Appl. No.: 308,354

[22] Filed: Sep. 19, 1994

[51] Int. Cl.$^6$ .................. H02K 1/27; H02K 1/28
[52] U.S. Cl. ............... 310/156; 310/261; 310/262; 310/61; 310/42
[58] Field of Search ................... 310/156, 152, 310/261, 262, 264, 271

[56] References Cited

U.S. PATENT DOCUMENTS

| | | | |
|---|---|---|---|
| 3,663,850 | 5/1972 | Phelon | 310/156 |
| 3,974,817 | 8/1976 | Henderson et al. | 310/156 |
| 4,115,716 | 9/1978 | Ogasawala et al. | 310/156 |
| 4,137,884 | 2/1979 | Odazima et al. | 310/156 |
| 4,219,752 | 8/1980 | Katon | 310/156 |
| 4,843,500 | 6/1989 | Elsaesser et al. | 310/156 |
| 4,877,986 | 10/1989 | Shimizu | 310/156 |
| 5,128,571 | 7/1992 | Itsu | 310/67 R |
| 5,157,295 | 10/1992 | Stefansky et al. | 310/90 |

FOREIGN PATENT DOCUMENTS

| | | | |
|---|---|---|---|
| 2641536 | 5/1977 | Germany | 310/156 |
| 6-292333 | 10/1994 | Japan | 310/156 |

*Primary Examiner*—Thomas M. Dougherty
*Assistant Examiner*—B. Mullins
*Attorney, Agent, or Firm*—Renner, Kenner, Greive, Bobak, Taylor & Weber

[57] ABSTRACT

A rotor assembly is provided in which a permanent magnet rotor is used in conjunction with a wound stator member. A containment fixture or cup, receives one or more permanent magnets. The containment fixture has an annular end wall, a circumferential side wall and a circumferential lip. The lip serves to provide a high degree of rigidity and rotational stability to the containment fixture. The magnets abut both the lip and the side wall and the rigidity of the fixture prevents flexing and breaking of the magnets even at high rotational speeds.

8 Claims, 2 Drawing Sheets

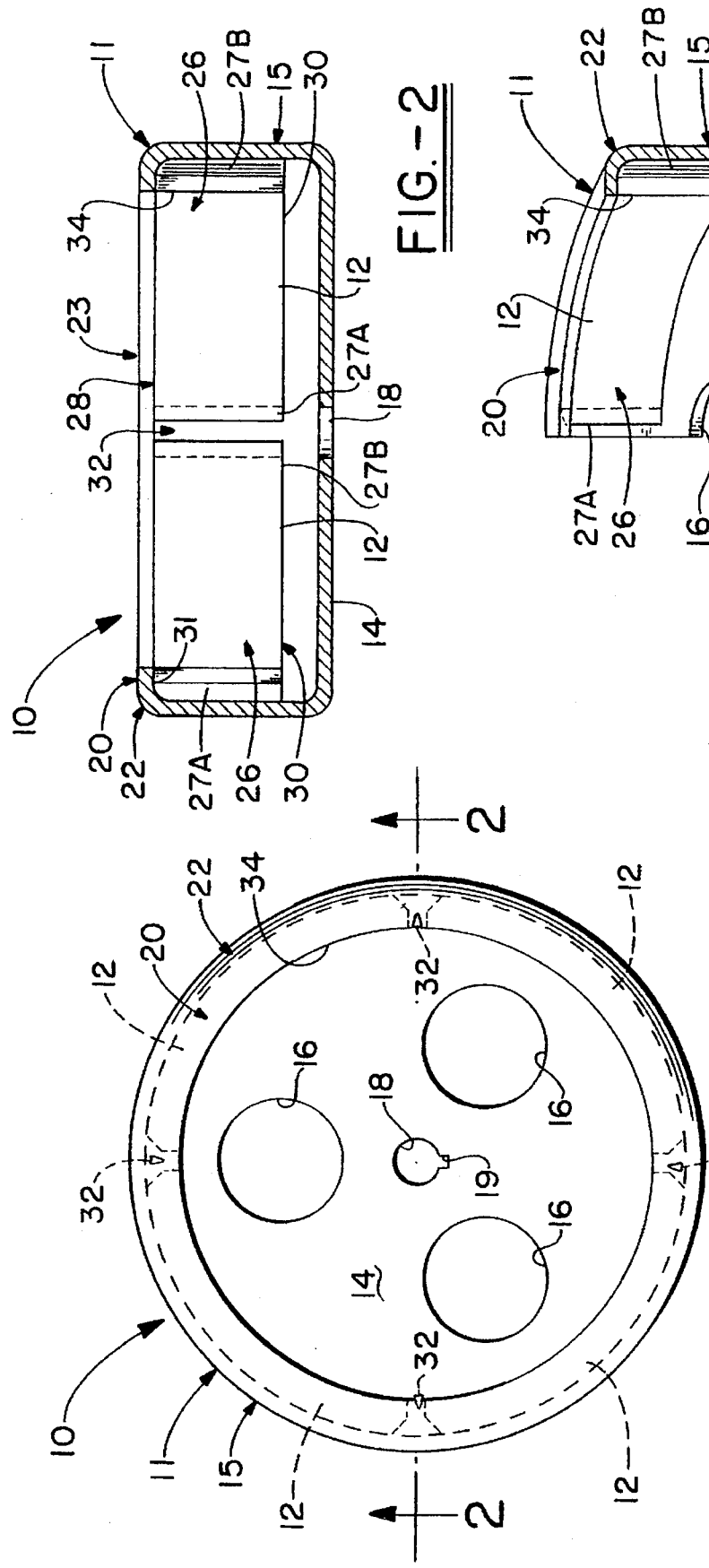

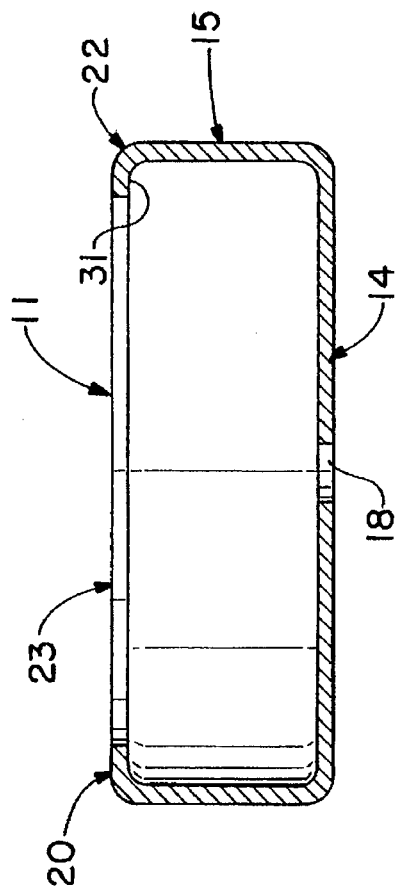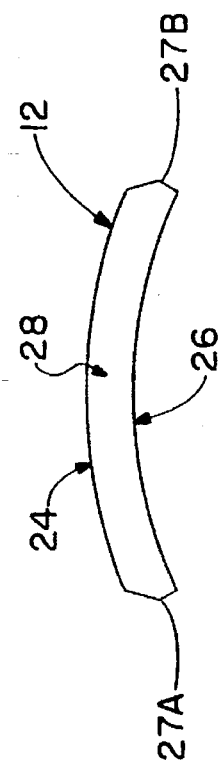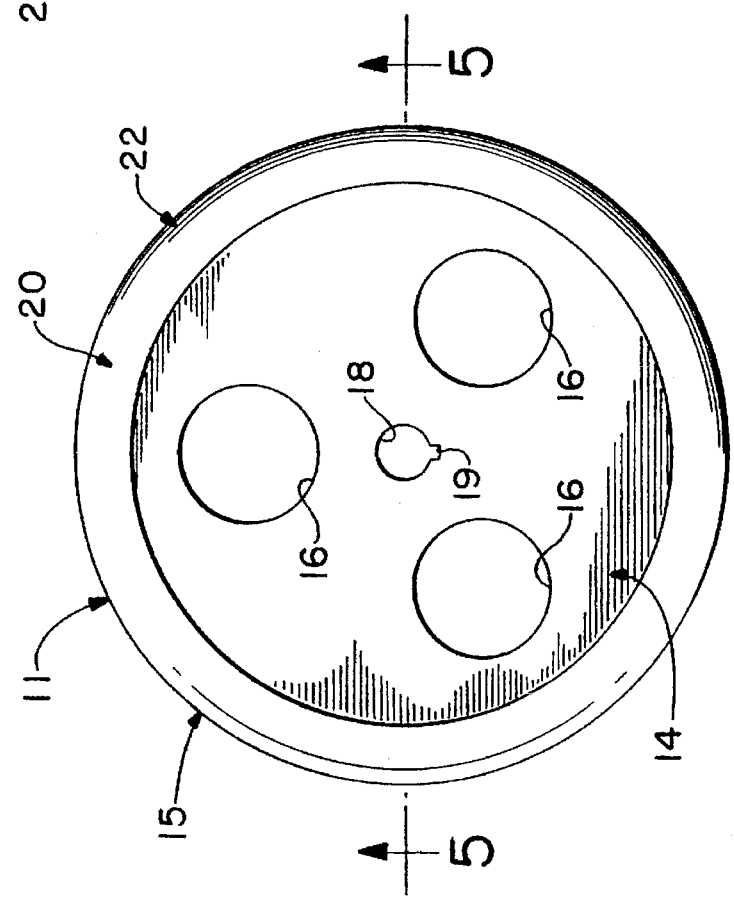

ROTOR CUP HAVING A ROLLED LOWER EDGE FOR SEGMENTED PERMANENT MAGNET MOTORS

TECHNICAL FIELD

The invention herein resides in the art of dynamoelectric machines such as motors and generators. More particularly, the invention relates to such machines having permanent magnet rotors. Specifically, the invention relates to cups for such rotors wherein segmented magnets are mounted.

BACKGROUND ART

Heretofore, it has been known to utilize permanent magnet rotor assemblies in conjunction with wound stator assemblies to produce compact motor units. Typically, segmented magnets are mounted within a cup-like containment fixture to form a rotor assembly. A wound stator assembly is located inside the rotor to provide the electromagnetic force needed to rotate the rotor assembly relative to the stator. A primary drawback associated with such known motor assemblies is the lack of support provided by the cups typically used. Conventional thin gauge cups, while being inexpensive, lightweight and capable of high speed rotation, do not provide the rotational stiffness or rigidity needed to support the conventional magnets. As such, flexing of the cup at high rotational speeds results in breakage of the magnets. Attempts at eliminating breakage have focused on basically three types of solutions to this problem. The first and most obvious solution is to run the motor at lower rotational speeds to reduce flexing of the cup and in-turn magnet breakage. This solution is unsatisfactory in many applications particularly where high speed capabilities are desired or required. The second attempted solution has been to utilize magnets having a high degree of inherent mechanical strength so as to resist breakage even when the cup flexes. This solution is similarly unsatisfactory as such magnets tend to be more expensive and heavier than conventional magnets. The extra weight of such magnets not only adds to the overall weight of the motor but also significantly increases assembly inertia at high speeds. Such an increase in inertia is undesirable in many applications. The third solution has been to manufacture cups from either heavier gauge material or alternative materials having a higher degree of rotational stability. This solution, likewise is unsatisfactory as it results in increased weight, increased material cost and increased manufacturing costs, all of which are undesirable.

Accordingly, there is a desire, as well as a need, to obtain a motor assembly which uses conventional magnets and thin gauge cup material while providing sufficient rotational rigidity to eliminate magnet breakage at high rotational speeds, without a significant increase in assembly inertia.

DISCLOSURE OF INVENTION

In light of the foregoing, it is an aspect of the invention to provide a rotor assembly having segmented magnets mounted in a cup-like containment fixture.

Another aspect of the invention is the provision of such a rotor assembly wherein the magnets and cup are manufactured from conventional, inexpensive and light gage ferromagnetic materials.

Yet an additional aspect of the invention is the provision of such a rotor assembly which provides increased rotational speed capabilities without a significant increase in assembly inertia.

A still further aspect of the invention is the provision of such a rotor assembly having a high degree of rotational rigidity at high rotational speeds so as to eliminate magnet breakage.

Yet another aspect of the invention is the provision of such a rotor assembly which may be easily and inexpensively produced using existing manufacturing techniques and facilities.

The foregoing and other aspects of the invention which will become apparent as the detailed description proceeds are achieved by the improvement in a dynamoelectric device having a permanent magnet rotor and a wound stator, comprising: a rotor assembly having a rotatable comment fixture, said containment fixture having an annular end wall, a circumferential side wall extending generally orthogonally from said end wall, and a circumferential lip extending generally orthogonally and radially inwardly from said side wall; and one or more permanent magnet members received within said containment fixture.

Other aspects of the invention are attained by a rotor assembly, comprising: a rotatable containment fixture having an annular end wall, a circumferential side wall extending generally orthogonally from said end wall and a circumferential lip extending orthogonally and radially inwardly from said side wall; and one or more permanent magnet members received within said containment fixture, said one or more permanent magnet members having an upper surface which abuttingly engages said circumferential lip and an outer surface which abuttingly engages said side wall; whereby said one or more permanent magnet members are maintained in stable orientation when said containment fixture is rotating.

Still other aspects of the invention are attained by a magnet containment fixture for permanent magnet rotor, the containment fixture comprising: an annular end wall; a circumferential side wall extending generally orthogonally from said end wall; and a circumferential lip extending generally orthogonally and radially inward from said side wall.

DESCRIPTION OF THE DRAWINGS

For a complete understanding of the objects, techniques and structure of the invention, reference should be made to the following detailed description and accompanying drawings wherein:

FIG. 1 is a top plan view of the rotor assembly according to the present invention;

FIG. 2 is a cross-sectional view of the assembly of FIG. 1 taken along the line 2—2;

FIG. 3 is a perspective view of a portion of the cross-section of FIG. 2;

FIG. 4 is a top plan view of the containment fixture (cup) of the invention;

FIG. 5 is a cross-sectional view of the fixture of FIG. 4 taken along the line 5—5; and FIG. 6 is a top plan view of a magnet member according to the present invention.

BEST MODE FOR CARRYING OUT THE INVENTION

Referring now to the drawings, it can be seen that a rotor assembly according to the invention is designated generally by the numeral 10. As is best shown in FIGS. 1–3 the rotor 10 is comprised generally of a containment fixture or cup 11 and one or more permanent magnet members 12. While it will be appreciated that the concept of the invention is applicable to permanent magnet rotors having any number of magnets 12 or poles, the description herein will be with respect to a rotor assembly 10 of the nature shown. In such a device there are four discrete permanent magnet strips 12 mounted within the cup 11.

With reference now to FIGS. 3, 4 and 5 it can be seen that the cup 11 is of a generally cylindrical shape having an annular end wall 14 and a circumferential side wall 15. The cup 11 is preferably manufactured from a low carbon, cold rolled steel with a 14 gauge thickness. However, it is contemplated that the cup could be manufactured from any one of a number of appropriate materials having a variety of different thicknesses. The cup 11 may further be provided with one or more ventilation apertures 16 in the end wall 14. The ventilation apertures 16 serve to allow the circulation of air around the stator (not shown) so as to dissipate heat and cool the windings during normal operation. The cup 11 is also provided with a shaft aperture 18 which is located at the center of the end wall 14. The shaft aperture 18 is provided to receive a rotor shaft (not shown) and the aperture 18 may include a keyway 19 for the purpose of engaging the cup. 11 with the shaft so as to prevent relative rotation between the cup and the shaft.

A novel aspect of the present invention is the provision of a rolled edge or lip 20 which extends radially inward from and orthogonal to the circumferential side wall 15. As is best seen in FIGS. 2 and 5 at the point where the side wall 15 bends to form the lip 20, a rounded transitional apex 22 is present. The lip 20 extends inwardly from the side wall for a distance approximating one quarter of the vertical extent of the side wall 15. Accordingly the end 23 of cup 11 opposite end wall 14 is substantially open, being bounded by the circumferentially continuous annular lip 20. Those skilled in the art will now recognize that the inclusion of such a lip 20 will substantially increase the stiffness or rigidity of the cup 11 without any change in the material of the cup itself.

Turning now to FIGS. 1–3 and 6 it can be seen that one or more strips of permanent magnet material 12 are provided for installation in the cup 11. The magnets 12 may be made of either a rigid or flexible material. As shown, magnet 12 has a convex outer surface 24 and a concave inner surface 26. The outer surface 24 has a radius approximating that of the inside circumference of the cup 11 as defined by the wall 15. The outer surface 24 and inner surface 26 are joined by end surfaces 27A, B. The magnets 12 are further defined by a top surface 28 and a bottom surface 30. The magnets 12 are received within the cup 11 as indicated in the drawings. As shown, the magnets 12 are radially oriented within the cup 11 and are positioned such that the outer surface 24 of each magnet 12 abuts the wall 15 of the cup 11. Similarly, this upper surface 28 of each magnet 12 abuts an interior surface 31 of the lip 20. The magnets 12 are each centered within the successive quadrants of the cup 11. Further, the length of each magnet 12 is somewhat shorter than the length of the arc defining each quadrant. As such, when each magnet 12 is centered in its respective quadrant, the end 27A is separated from the end 27B of the adjacent magnet 12 by a small air gap 32. The magnets 12 are thus spaced at equal intervals about the interior of the cup 11 such that the inner surface 26 of the magnets 12 form an interior wall 34 concentric with that of the cup 11. The magnets 12 may be mounted to the cup wall 15 by way of any appropriate means such as an adhesive material. While those skilled in the art will recognize that the magnets 12 are installed and oriented within the cup 11 in a conventional manner they should further recognize the manner in which the novel lip 20 facilitates placement of the magnets 12. The magnets 12 are seated firmly against the wall 15 and the lip 20 so as to provide a most stable point of engagement.

It has been found that rotor assemblies 10 made according to the present invention have a higher degree of rotational rigidity and stability than similar rotors which do not incorporate the novel lip 20. This increase in rotational stability gives the rotor a higher rotational speed capability without the increased risk of magnet breakage due to cup flexing. This increased speed capability is achieved without the need to employ heavier, more costly materials such as magnets having a high degree of inherent mechanical strength. By facilitating higher speeds without a change in materials there is little accompanying increase in assembly inertia. Further, the rotor assembly 10 may be manufactured using existing equipment, the lip 20 being formed by conventional rolling, spinning or forming equipment.

Thus it can be seen that the objects of the invention have been satisfied by the structure presented above. While in accordance with the patent statutes only the best mode and preferred embodiment of the invention has been presented and described in detail, it is to be understood that the invention is not limited thereto or thereby. Accordingly, for an appreciation of the true scope and breadth of the invention reference should be made to the following claims.

What is claimed is:

1. In a dynamoelectric device having a permanent magnet rotor and a wound stator, the improvement comprising:

a rotor assembly having a rotatable containment fixture, said containment fixture having an annular end wall, a circumferential side wall extending generally orthogonally from said end wall, and a circumferential lip extending generally orthogonally and radially inwardly from said side wall at an end of said side wall opposite said annular end wall;

one or more permanent magnet members received within said containment fixture, said permanent magnet members having an outer surface opposite an inner surface connected by opposed top and bottom surfaces, wherein said outer surface is secured directly to said circumferential side wall, said top surface is secured to said circumferential lip, said circumferential lip extending radially inwardly from said circumferential side wall at least a distance equal to said top surface, and wherein said bottom surface is spaced apart from said annular end wall;

said containment fixture further including one or more ventilation apertures; and said containment fixture is manufactured from a low carbon, cold rolled steel having a thickness in the range of 12–18 gage.

2. The improvement in a dynamoelectric device according to claim 1, wherein said one or more permanent magnet members abut said circumferential side wall and said circumferential lip, so that said one or more permanent magnet members are maintained in stable condition when said containment fixture is rotated.

3. The improvement in a dynamoelectric device according to claim 1, wherein said one or more permanent magnet members are manufactured from a flexible magnetic material.

4. The improvement in a dynamoelectric device according to claim 1, wherein said one or more permanent magnet members are manufactured from a rigid magnetic material.

5. The improvement in a dynamoelectric device according to claim 1, wherein said one or more permanent magnet members provide said rotor assembly with two or more magnetic poles.

6. A rotor assembly, comprising:

a rotatable containment fixture having an annular end wall, a circumferential side wall extending generally orthogonally from said end wall and a circumferential lip extending orthogonally and radially inwardly from said side wall at an end of said side wall opposite said annular end wall;

one or more permanent magnet members received within said containment fixture, said one or more permanent magnet members having an upper surface which abutingly engages without extending past said circumferential lip, a lower surface space apart from said annular end wall and an outer surface which abutingly engages said circumferential side wall;

said containment fixture further including one or more ventilation apertures; and said containment fixture is manufactured from a low carbon, cold rolled steel having a thickness of approximately 12–18 gage;

whereby said abutting engagement of said outer surface and said upper surface of said one or more permanent magnet members with said side wall and said lip of said containment fixture serves to maintain said one or more permanent magnet members in stable orientation when said containment fixture is rotating.

7. A rotor assembly according to claim 6, wherein said one or more permanent magnet members are manufactured from a flexible magnetic material.

8. A rotor assembly according to claim 6, wherein said one or more permanent magnet members are manufactured from a rigid magnetic material.

* * * * *